COMPOSITE OPTICAL IMAGE PROJECTION APPARATUS

Original Filed Jan. 21, 1954 4 Sheets-Sheet 1

INVENTORS
Thomas B. Howell
Milton Rogin

BY Dean Fairbank & Hirsch
ATTORNEYS

COMPOSITE OPTICAL IMAGE PROJECTION APPARATUS

Original Filed Jan. 21, 1954 4 Sheets-Sheet 2

INVENTORS
Thomas B. Howell
Milton Rogin
BY Dean Fairbank & Hirsch
ATTORNEYS

COMPOSITE OPTICAL IMAGE PROJECTION APPARATUS

Original Filed Jan. 21, 1954 4 Sheets-Sheet 3

INVENTORS
Thomas B. Howell
Milton Rogin
BY Dean, Fairbank & Hirsch
ATTORNEYS

COMPOSITE OPTICAL IMAGE PROJECTION APPARATUS

Original Filed Jan. 21, 1954 4 Sheets-Sheet 4

INVENTORS
Thomas B. Howell
Milton Rogin
BY Dean Lambe & Hirsch
ATTORNEYS

United States Patent Office

Re. 24,525
Reissued Aug. 26, 1958

24,525

COMPOSITE OPTICAL IMAGE PROJECTION APPARATUS

Thomas B. Howell, Larchmont, and Milton Rogin, Woodmere, N. Y., assignors to Howell-Rogin Studio, Inc., New York, N. Y., a corporation of New York Original No. 2,754,722, dated July 17, 1956, Serial No. 405,474, January 21, 1954. Application for reissue December 24, 1957, Serial No. 708,338

11 Claims. (Cl. 88—24)

Matter enclosed in heavy brackets [ ] appears in the original patent but forms no part of this reissue specification; matter printed in italics indicates the additions made by reissue.

This invention relates to the art of projection equipment, more particularly of the type to provide unique visual effects for *direct demonstration purposes, for recording on film, or for* television transmission.

In order to achieve versatility in *direct demonstration, recording on film or* television transmission, it is desirable that a wide range of visual effects be provided. Thus in many types of *direct demonstrations, such as during lectures, and the like; in the preparation of films such as of the educational or expositive type, cartoons, film productions where composite effects are desired, and the like; and in television* programs, especially weather shows, news programs, sports, commercials and in titling a program and in giving credits; it may be desired to project a single or composite image; to have a horizontal wipe of one image as another is made to appear; to have a lap dissolve in which one image is gradually dissolved as another is made to appear, to have an iris dissolve of one image as another gradually appears; to have an instantaneous cut from one image to another; to have a moving title appear on a screen and so forth.

Where such effects require the services of many personnel or the use of complicated electronic equipment that requires well trained personnel for operation, not only is the cost of program presentation high, but the initial cost of the equipment may be prohibitive [in the case of small stations].

It is accordingly among the objects of the invention to provide a neat, compact, sturdy and relatively low cost projection equipment having but few relatively simple parts which may readily be assembled and are not likely to become out of order and which may readily be operated after but a short period of instruction to produce the desired visual effects above enumerated.

According to the invention, the light from each of a pair of spaced projectors, after it passes through an associated transparency, is combined so that a composite image is produced of the subject matter on such transparencies. Each projector has a separate control to regulate the intensity of the light therefrom and an adjustable iris is also associated with each projector to control the diameter or width of the beam of light.

A slidable device is desirably provided which may be positioned over the transparencies and is movable in such manner that a horizontal wiping effect may be produced to cause one of the projected images to appear as the other is wiped out.

In addition, a device is also provided which may be mounted over the output of one of the projectors and which will cause progressive movement of a transparent strip past such light output for projection of a moving image on a screen.

Figure 1:
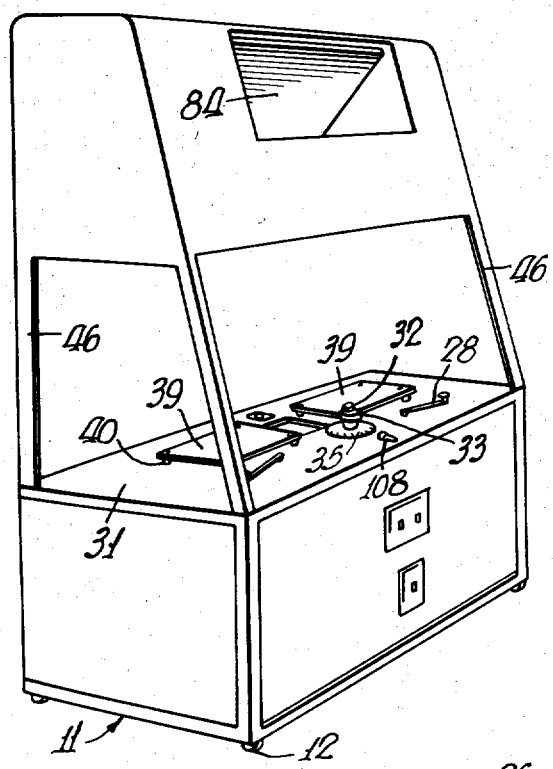
Figure 3:
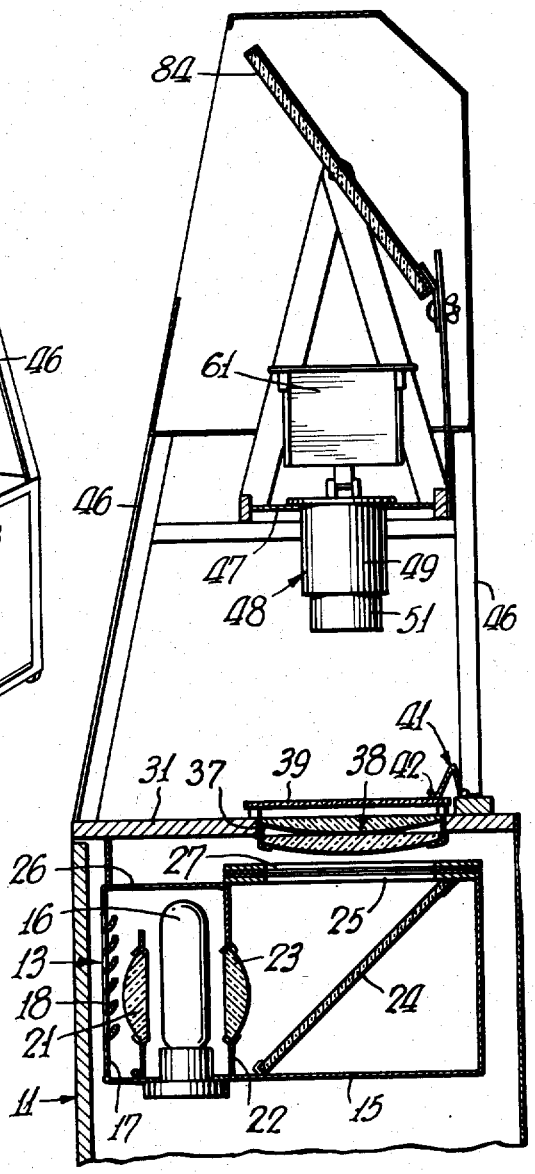
Figure 5:
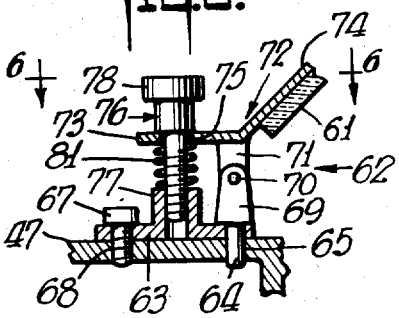
Figure 6:
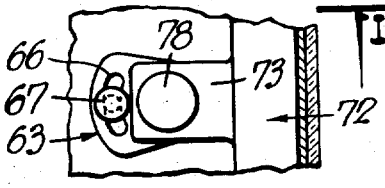
Figure 2:
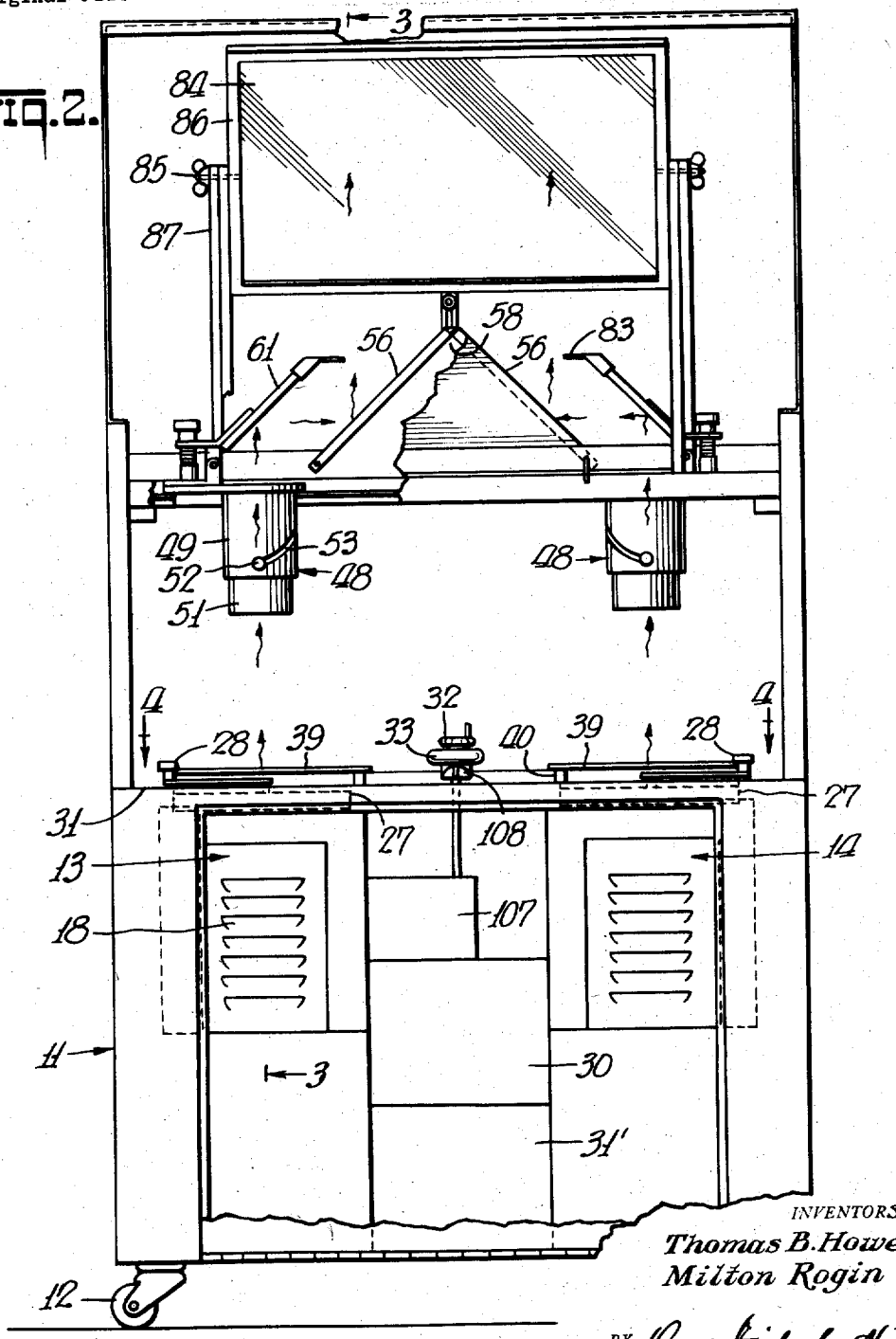
Figure 4:
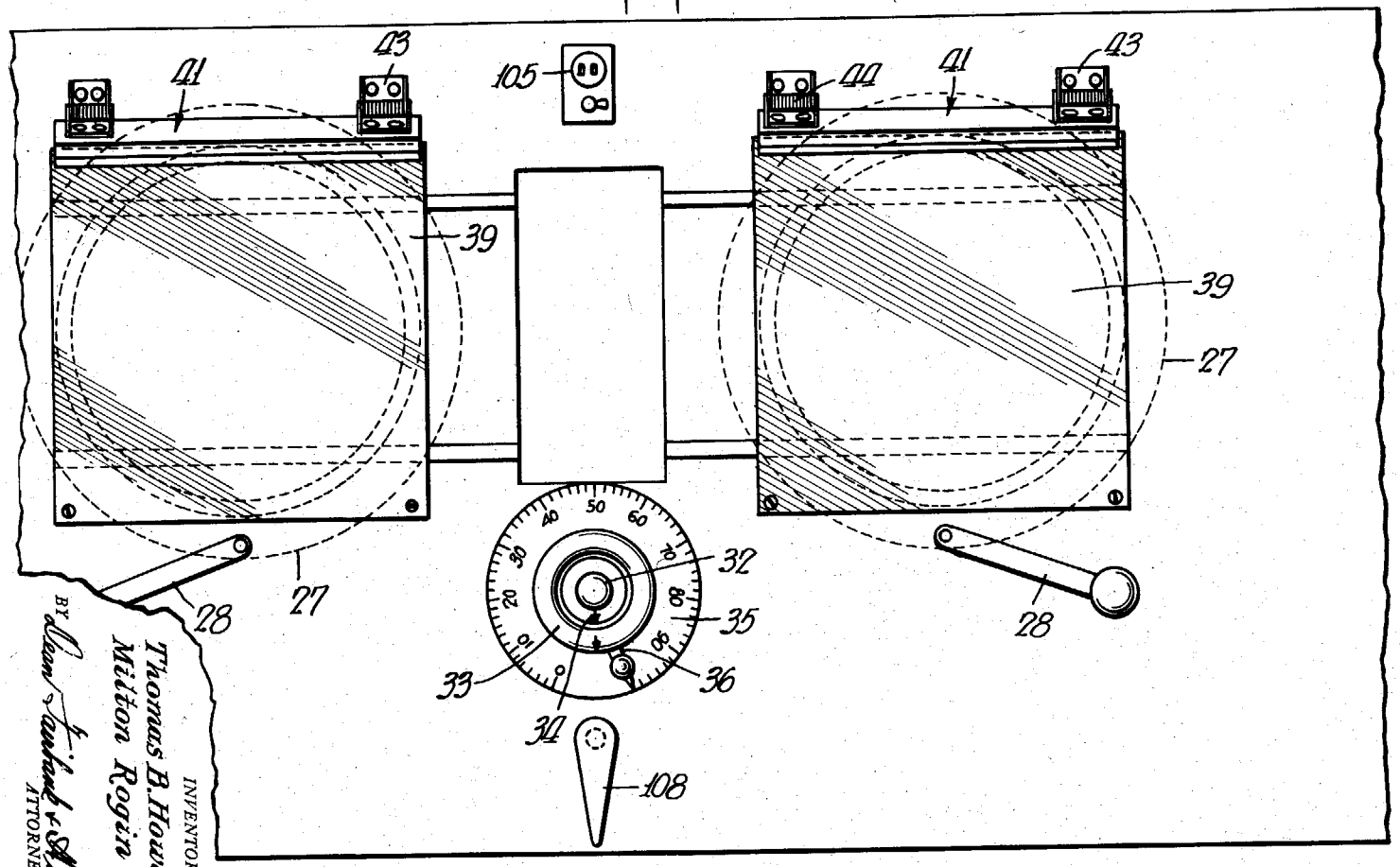
Figure 7:
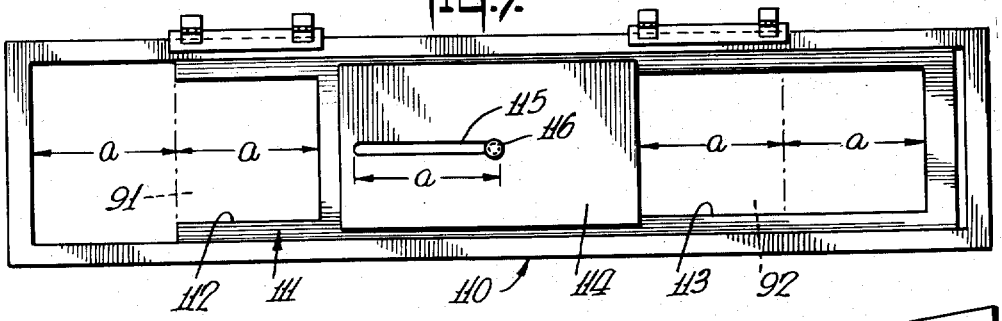
Figure 8:
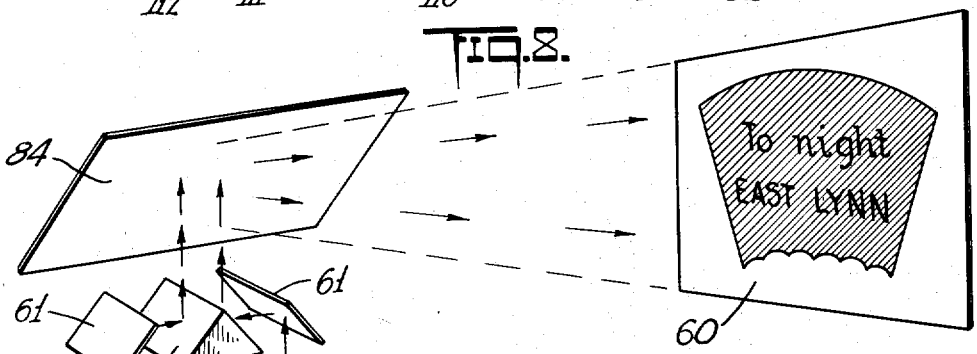
Figure 9:
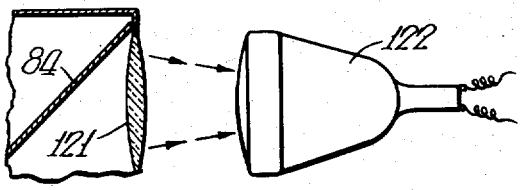
Figure 10:
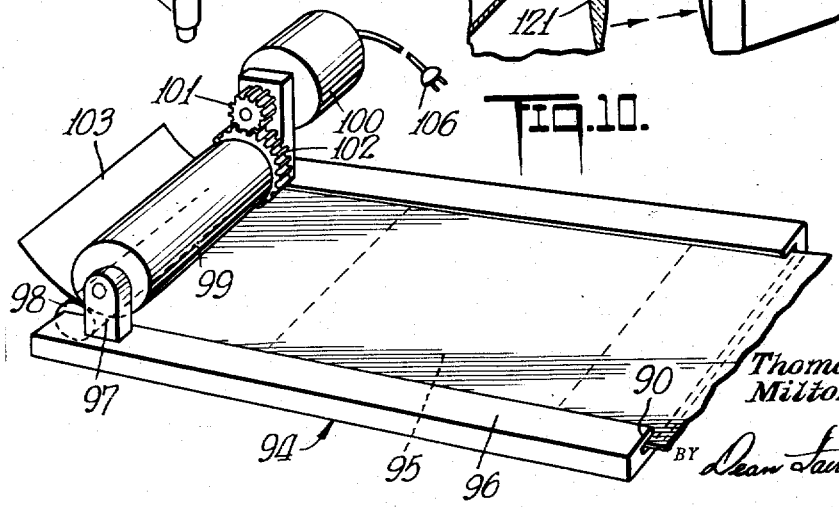

In the accompanying drawings in which are shown one or more of various possible embodiments of the several features of the invention, Fig. 1 is a perspective view of the projection equipment, Fig. 2 is a front view of the equipment with parts broken away, Fig. 3 is a sectional view taken along line 3—3 of Fig. 2, Fig. 4 is a plan view taken along line 4—4 of Fig. 2, Fig. 5 is a vertical sectional view on an enlarged scale of a mirror mount, Fig. 6 is a plan view taken along line 6—6 of Fig. 5, Fig. 7 is a plan view of a picture wiping device, Fig. 8 is a diagrammatic view illustrating the operation of the equipment according to one application thereof, Fig. 9 is a view similar to Fig. 8 of another application thereof, and Fig. 10 is a perspective view of a device for providing a moving image.

Referring now to the drawings, the projection equipment desirably comprises a substantially rectangular hollow base 11, preferably mounted on suitable casters 12 for ease in moving. Positioned in the base 11 are a plurality of light projectors, illustratively two in number and designated 13 and 14 respectively. Each of the projectors, clearly shown in Fig. 3, comprises a substantially rectangular container 15 having a lamp 16 near the front wall 17 thereof, the latter being provided with ventilating louvers 18.

Positioned in container 15 on one side of the lamp adjacent wall 17 is a vertical reflecting mirror 21 and positioned on the opposite side of the lamp, supported by suitable brackets 22 mounted on the container 15 is a vertical lens 23. The container 15 desirably has a mirror 24 therein against which the light from the lamp 16 will be projected. The mirror is inclined rearwardly at such an angle that the light projected thereagainst will be reflected upwardly through an opening 25 in the top wall 26 of container 15 and through an adjustable iris 27 mounted on top wall 26 above opening 25. The iris 27 is controlled by means of a handle 28 positioned on the outer surface of the top wall 31 of the base, as is clearly shown in Fig. 1.

In order to control the intensity of the light emitted by each of the lamps 16, a suitable electrical control is provided. To this end, as is clearly shown in Fig. 2, a pair of variable transformers 30 and 31' commonly known as "Variacs" to adjust the voltage applied to the lamps are centrally positioned in the base 11 desirably mounted one on top of the other. Each of the "Variacs" has an associated vertical shaft (not shown), desirably in coaxial relationship which rise through the top wall 31 of the base. Each of the shafts has an associated knob 32 and 33 at its upper end so that the "Variacs" may be operated independently of each other, each knob having a pointer 34 associated with the calibrated plate 35 to indicate the setting of the "Variacs." In addition, by means of a locking member 36, the two shafts may be joined together in any position of adjustment thereof so that upon rotation, the intensity of the light from one of the lamps may be reduced and the intensity of the light from the other lamp may be increased or vice versa, thereby providing a gradual and uniform fadeout or lap dissolve from one image to the other.

As shown in Fig. 3, the top wall 31 has an opening 37 over each of the irises 27 and a lens system 38 is mounted in each of said openings 37 so that the light from the lamp 16 reflected from mirror 24 will be projected upwardly therethrough.

Mounted on top wall 31 over each of the lenses 38 is a rectangular transparent plate 39 desirably of glass which is spaced from the top wall as by sleeves 40.

Associated with each of the plates 39 is an elongated clamp 41 desirably U-shaped in cross section having an upwardly bent lip 42 at its front edge. The rear edge of the clamp is desirably hingedly connected as at 43 to the top wall 31 at the rear of the associated plate 39 and by means of a coil spring 44 associated with each of the hinge mounts 43, the front edge 42 of the clamp is urged against the plate 39. Thus, for example, when a transparency is positioned on a plate 39 with its rear edge inserted beneath the front edge 42 of the clamp, the transparency will be securely retained in fixed position on the plate so that light may be projected therethrough without likelihood of movement of the transparency.

Rising from the base 11 at each corner of its top wall 31 is a brace 46. The braces 46 at the rear of the base desirably extend vertically upward and the bases 46 at the front of the base desirably are inclined slightly toward the rear as is clearly shown in Figs. 1 and 3. Extending parallel to the top wall 31 of the base and supported at its ends by the upright braces 46 is a shelf 47 on which is securely mounted directly over each of the lenses 38 a lens system 48. The lens system 48 may comprise a holder 49 in which is positioned a lens 51, the vertical position of which is adjustable by means of a pin 52 affixed to the lens and movable in an inclined slot 53 in the holder 49.

The light passing through each of the lenses 51 is designed to be reflected by means of a suitable optical system so that the image on the transparency may be projected.

The optical system desirably comprises a pair of substantially rectangular mirrors 56 suitably supported on the top of shelf 47 midway between lenses 48. The mirrors are positioned so that *they lie in intersecting planes whereby* an angle of approximately 90 degrees is formed at their upper edges as at 58 and the front of the mirrors are inclined upwardly facing in opposed directions toward the associated lens 48. *The angle of approximately 90° formed by the two mirror planes inherently permits optimum angular alignment of the two images forming the composite image, as well as ease of lateral and vertical alignment inherently resulting from the general arrangement of this mirror system in conjunction with that now to be described hereinbelow.*

To reflect the light from the lens system 48 onto the associated mirror 56, a pair of adjustable substantially rectangular mirrors 61 are provided associated respectively with each of such lens systems 48 and each being mounted on a holder 62 (Figs. 5 and 6). Each of the holders 62 comprises a plate 63 having a depending pin 64 at one end which extends through a suitable opening 65 in the shelf 47 between the lens 48 and the end of the shelf. The other end of the plate desirably has an arcuate slot 66 therein (Fig. 6) through which extends a headed screw 67, the lower end of the latter being threaded into a correspondingly threaded opening 68 in the shelf. Thus the plate may be rotated to desired position about its pivot 64 and retained in such position by tightening the screw 67. The end of the plate substantially directly above the pivot pin 64 desirably has an upstanding bifurcated bracket 69 between the legs of which is pivotally mounted, as at 70, a finger 71. The upper end of the finger supports a bracket 72 which, as is clearly shown in Fig. 5, has a substantially horizontal leg 73 extending over the plate 63 and an upwardly inclined leg 64 which is securely affixed to the rear of the mirror 61 to retain the latter at an incline. The leg 73 has an enlarged opening 75 through which extends the stem of a screw 76, the lower end of the latter being threaded into a suitably threaded upright bushing 77, preferably formed integral with the plate 63. The upper end of the screw 76 desirably has an enlarged head 78 of greater diameter than the diameter of the opening 75 and the stem of the screw is encompassed by a coil spring 81 interposed between the bushing 77 and the undersurface of the leg 73. Thus, by rotating the screw 76, the bracket 72 may be moved about its pivot 70 to set the mirror 61 at a desired inclination facing the associated mirror 56.

As is clearly shown in Fig. 2, the upper edge of the mirror may have an outwardly extending lip 83 which serves to prevent stray reflections. The mirrors 61 are positioned so that they will be inclined toward each other, as is clearly shown in Fig. 2, in such manner that the light projected thereagainst from the associated lens 48 will be reflected against the associated mirror 56 to be reflected thereby onto an inclined mirror 84. *The inclined mirror 84 is preferably inclined in a plane that forms substantially equal angles with each of said planes of the associated mirrors 56.*

The mirror 84 is substantially rectangular and desirably has a laterally extending threaded stud 85 at each of its side edges 86. Each of the studs pass through suitable openings in the upper end of an associated pair of upstanding struts 87 supported at their lower ends on the shelf 47. The mirror is retained in any suitable position of inclination by means of a wing nut 88 threaded on each of the protruding ends of the studs 85.

Although the reflecting mirrors utilized in the equipment, above described, may be of any suitable type, it is preferred to use front surface mirrors in all cases, to prevent any distortion due to the thickness of the glass forming the mirror which would occur in the case of rear surface mirrors.

An illustrative use of the equipment above described, may be to project images upon a screen *for direct viewing, for filming by a moving picture or other camera, or* for pickup by a television camera. The screen may be remote from the equipment or if desired, the equipment may have a self contained screen, desirably of ground glass (not shown) positioned in front of the inclined mirror so that the image projected on the rear of the screen may be seen on the front.

As diagrammatically shown in Fig. 8, a transparency 91 having lettering thereon is positioned on one of the plates 39 with its rear edge beneath clamp 41. A second transparency 92 having a frame work thereon is positioned in similar manner on the other plate 39. When the lamps 16 shown in Fig. 3 are energized, the light therefrom will is reflected by mirror 21 through lens 23 and projected against inclined mirror 24. Thereupon, such light will be reflected upwardly through iris 27, the lens system 38 and the associated transparency into the lens system 48. From such lens system 48 the light will be projected against inclined mirror 61 and reflected therefrom against the associated inclined mirror 56 to be reflected thereby against the mirror 84 which is inclined at such angle that it will project the images onto the screen 60.

In order that the two images from the respective transparencies 91, 92 may be properly superimposed, the inclined mirrors 61 are adjusted by merely rotating the screws 76. By varying the inclination of the mirrors 61 the position of the reflected image may be moved from left to right along the mirror 84. In the event that the images should be vertically displaced, it is merely necessary to move the plate 63 slightly about its pivot pin 64 until proper vertical alignment is attained. Thus, by means of the adjustments above described, there is no need for extreme accuracy in the positioning of the transparencies on the plates 39 and the two images on the transparencies when projected on the screen may be properly aligned both transversely and vertically.

The equipment above described permits various effects to be produced. Thus, by clamping together the shafts of the two "Variacs" 30, 31' by means of lever 36 and rotating the knob 33 for simultaneous actuation of both variacs, one of the lamps may be energized and the other deenergized gradually, producing a uniform dissolve from one image to the other. Thus the frame on transparency 92 might first be shown and such frame would gradually disappear and the lettering on transparency 91 would appear.

By independent manipulation of the knobs 32, 33 the frame on transparency 92 may first be projected on the screen and thereupon the lettering on transparency 91 may slowly be illuminated to fill the outline of the frame to form a composite image. Various other effects which would be readily apparent to those skilled in the art may be achieved by the manipulation of the variacs.

In addition to the dissolve effect produced by the operation of the variacs, opening and closing of the irises by means of the handles 28 will produce other desirable effects.

The equipment above described is also readily adaptable for the projection of a moving title upon a screen. To this end the mechanism shown in Fig. 10 is provided. This mechanism may comprise a substantially rectangular plate 94 having a rectangular opening 95 therein and inturned lateral flanges 96. Extending transversely across the plate at one end thereof and rotatably mounted in suitable brackets 97 are rollers 98 and 99, the roller 99 being driven as by means of a motor 100 having a pinion 101 coacting with a suitable gear 102 on the roller 99. Thus, when a strip transparency 103, having titles and printing thereon, is positioned underneath the rollers 98 and 99 and between the flanges 96 and the motor 100 is energized, the transparency will slowly move along the plate 94 over the opening 95.

The plate 94 may readily be positioned on one of the transparent plates 39 with its opening 95 aligned with such transparent plate and retained on the latter by means on the clamp 41.

As shown in Fig. 4, the wall 31 desirably has a connector outlet 105 to receive the plug 106 of the cable of motor 100 and by means of a combined switch and rheostat 107 controlled by a lever 108 shown in Fig. 4, the motor may be energized and the speed of the motor controlled.

With the above construction a title may be reflected in the manner previously described onto the adjustable mirror 84 and then projected upon a screen for *direct viewing, filming by a camera, or* pickup by a television camera in conventional manner.

In additoin to the foregoing effects, the equipment is adaptable also for use with a device which produced a wiping effect. This device is clearly shown in Fig. 7 and comprises a substantially rectangular frame 110 in which is slidably mounted a rectangular elongated panel 111 having a rectangular cut-out 112 at one end of length substantially equal to the width of the transparency 91 and a rectangular opening 113 at the other end of length substantially twice the width of the transparency 92. Slidably mounted on the panel 111 between the cut-out 112 and the opening 113 is an elongated panel 114 having a centrally located longitudinal slot 115 therein through which extends a headed pin 116.

The pin 116 is so positioned with respect to the slot 115 that in one extreme position of the slide 114, it will be completely clear of opening 113 and in the other extreme position it will cover one-half of opening 113.

The frame 110 is of such length that when positioned on top wall 31 of the base 11 the cut-out 112 and half of opening 113 may lie directly one over the respective plates 39.

With transparencies 91 and 92 positioned on the respective plates 39 beneath frame 110 and with the panel 111 and slide 114 in the position shown in Fig. 7, the images on both transparencies will be projected. As the slide 114 is moved to its extreme position to the right, the projected image from the transparency 92 will be wiped out. With the slide in such extreme right hand position, if the panel 111 is moved to the left, the projected image from transparency 91 will be wiped out as the projected image from transparency 92 appears, and with the panel 111 in the extreme left hand position in which transparency 91 is not projected, if the panel 111 is moved to the right, the projected image from the transparency 91 will appear as the projected image from the transparency 92 disappears.

In the application of the equipment shown in Fig. 9, instead of using a screen against which to project the image for pickup by a television camera, the image reflected from mirror 84 is passed through a lens 121 and projected directly into the pickup tube 122 of the television camera.

The numerous visual effects which may be produced with the equipment above described by simple manipulations thereof, add considerably to the attractiveness and interest of *direct viewing, film and* television programs and as the equipment utilizes substantially conventional parts which are easy to assemble and not likely to become out of order, such equipment is of relatively low cost and requires a minimum of maintenance.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A composite optical image projecting apparatus comprising a substantially hollow base having a substantially horizontal top wall, a pair of spaced lenses in said top wall, a pair of light projectors in said base to project light through said lenses respectively, a support positioned above the top wall of said base, a second pair of spaced lenses mounted on said support and positioned respectively over the lenses in said top wall, a pair of mirrors mounted on said support inclined toward each other and positioned in the path of the light from the second pair of lenses respectively, a second pair of inclined mirrors mounted on said support between said first pair of mirrors and facing the mirrors of said first pair respectively, to reflect the light reflected from the first pair of mirrors, and an additional mirror mounted on said support above the first two pairs of mirrors, said additional mirror being inclined so as to reflect the light from both of the mirrors of said second pair of mirrors.

2. The combination set forth in claim 1 in which said mirrors are front surface mirrors.

3. The combination set forth in claim 1 in which a clamp is mounted on said top wall of said base adjacent each of the lenses therein, whereby a transparency may be retained in position on said top wall over each of said lenses.

4. The combination recited in claim 1 in which a transparent plate is positioned on said top wall over each of the lenses therein and a clamp member is mounted on said top wall adjacent each of said plates.

5. The combination recited in claim 1 in which an adjustable iris is associated with each of the lenses in said top wall positioned between the lens and the light projector.

6. The combination recited in claim 1 in which an adjustable iris is associated with each of the lenses in said top wall positioned between the lens and the light projector and means are provided to adjust the intensity of the light emitted by each of the projectors.

7. The combination set forth in claim 1 in which said support comprises a shelf positioned over said top wall and spaced therefrom, an adjustable mount for each of the mirrors of said first pair of mirrors, each of said mounts comprising a base plate, means mounting said base plate for rotation of the latter in a horizontal plane, a bracket rising from the plate adjacent its mount, an arm affixed to an associated mirror and pivotally mounted in said bracket on an axis at right angles to the axis of the mount of the base plate, and means to pivot said arm to adjust the inclination of the associated mirror.

8. The combination set forth in claim 1 in which a ground glass screen is positioned in front of said last named inclined mirror.

9. The combination set forth in claim 1 in which a lens is positioned in front of said last named inclined mirror to concentrate the rays of light reflected therefrom.

*10. A composite optical image projecting apparatus comprising a substantially hollow base having a substantially horizontal top wall, a pair of spaced lenses in said top wall, a pair of light projectors in said base to project light through said lenses respectively, a support positioned above the top wall of said base, a second pair of spaced lenses mounted on said support and positioned respectively over the lenses in said top wall, a pair of mirrors mounted on said support inclined toward each other and positioned in the path of the light from the second pair of lenses respectively, a second pair of inclined mirrors mounted on said support between said first pair of mirrors and facing the mirrors of said first pair respectively, to reflect the light reflected from the first pair of mirrors, said second pair of mirrors lying in planes that intersect to form an angle of 90°, and an additional mirror mounted on said support above the first two pairs of mirrors, said additional mirror being inclined so as to reflect the light from from both of the mirrors of said second pair of mirrors.*

*11. A composite optical image projecting apparatus comprising a substantially hollow base having a substantially horizontal top wall, a pair of spaced lenses in said top wall, a pair of light projectors in said base to project light through said lenses respectively, a support positioned above the top wall of said base, a second pair of spaced lenses mounted on said support and positioned respectively over the lenses in said top wall, a pair of mirrors mounted on said support inclined toward each other and positioned in the path of the light from the second pair of lenses respectively, a second pair of inclined mirrors mounted on said support between said first pair of mirrors and facing the mirrors of said first pair respectively, to reflect the light reflected from the first pair of mirrors, said second pair of mirrors lying in planes that intersect to form an angle of 90°, and an additional mirror mounted on said support above the first two pairs of mirrors, said additional mirror being inclined so as to reflect the light from both of the mirrors of said second pair of mirrors, and positioned in a plane that forms substantially equal angles with each of said planes of said second pair of mirrors.*

References Cited in the file of this patent or the original patent

UNITED STATES PATENTS

| | | |
|---|---|---|
| 595,541 | Hollen | Dec. 14, 1897 |
| 724,452 | Edmonds | Apr. 7, 1903 |
| 887,839 | Patterson | May 19, 1908 |
| 941,752 | Ashley | Nov. 30, 1909 |
| 1,282,743 | Brenkert | Oct. 29, 1918 |
| 2,061,378 | Henze et al. | Nov. 17, 1936 |
| 2,155,248 | Adams et al. | Apr. 18, 1939 |
| 2,179,799 | Phillips | Nov. 14, 1939 |
| 2,365,613 | Wibmer et al. | Dec. 19, 1944 |
| 2,406,451 | Borkenstein | Aug. 27, 1946 |
| 2,456,296 | McDill | Dec. 14, 1948 |
| 2,477,923 | Fitt | Aug. 2, 1949 |
| 2,484,405 | Hansel | Oct. 11, 1949 |